Figure 1:
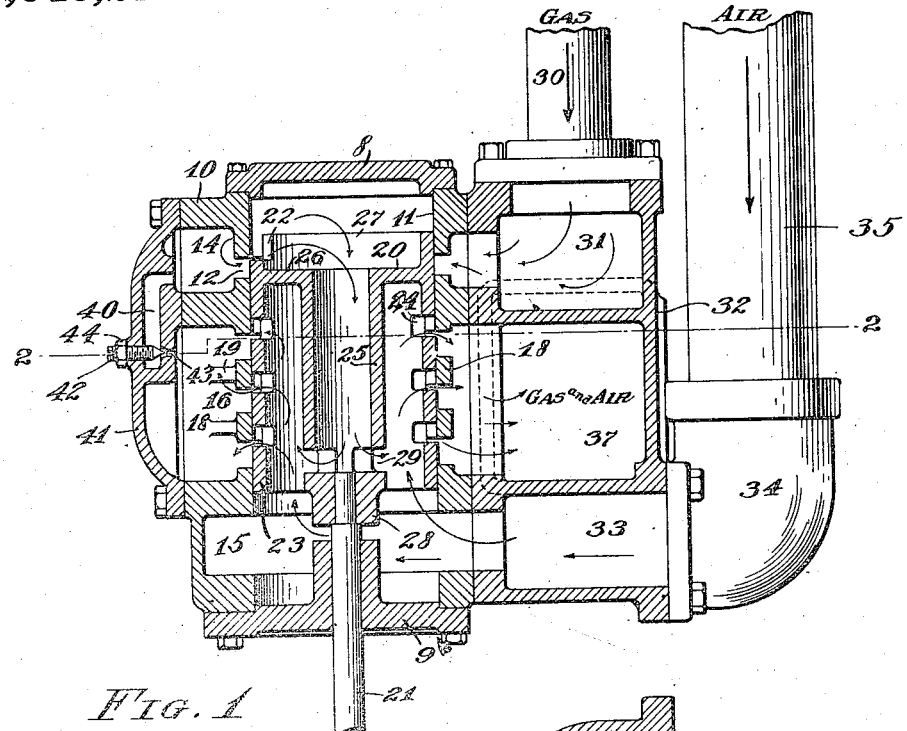

J. B. MERIAM & H. L. ALLEN.
GAS ENGINE VALVE.
APPLICATION FILED MAR. 10, 1911.

1,046,210.

Patented Dec. 3, 1912.

WITNESSES:

INVENTORS:
Joseph B. Meriam and
Harry L. Allen.
BY Albert H. Bates
ATTY.

UNITED STATES PATENT OFFICE.

JOSEPH B. MERIAM AND HARRY L. ALLEN, OF CLEVELAND, OHIO, ASSIGNORS TO THE BRUCE-MACBETH ENGINE COMPANY, OF CLEVELAND, OHIO, A CORPORATION OF OHIO.

GAS-ENGINE VALVE.

1,046,210.   Specification of Letters Patent.   Patented Dec. 3, 1912.

Application filed March 10, 1911. Serial No. 613,660.

*To all whom it may concern:*

Be it known that we, JOSEPH B. MERIAM and HARRY L. ALLEN, citizens of the United States, residing at Cleveland, in the county of Cuyahoga and State of Ohio, have invented a certain new and useful Improvement in Gas-Engine Valves, of which the following is a full, clear, and exact description, reference being had to the accompanying drawings.

The object of this invention is to provide an effective governing valve for gas engines.

Our valve not only acts as mixer for the gas and air, but it performs a double throttling action, controlling the gas as it passes into communication with the air, and also controlling the mixture of gas and air as same passes to the engine. This feature is one of great value, for the mixed gas and air is of much lower pressure than the gas alone, and its passageways are correspondingly larger, and hence, by governing the mixture, a much less variation in regulation results from a given variation in the size of the passageway.

To prevent the action of the valve, in throttling the gas, being too abrupt, where a very light load is used, we provide a by-pass from the gas conduit directly to the conduit for mixed gas and air beyond the governing valve. This insures a certain minimum amount of gas at all times, and does away with the necessity of gas ports being made with the greatest accuracy.

Our invention is illustrated in the drawings herein, is hereinafter more fully explained, and its characteristics set out in the claims.

Figure 2:
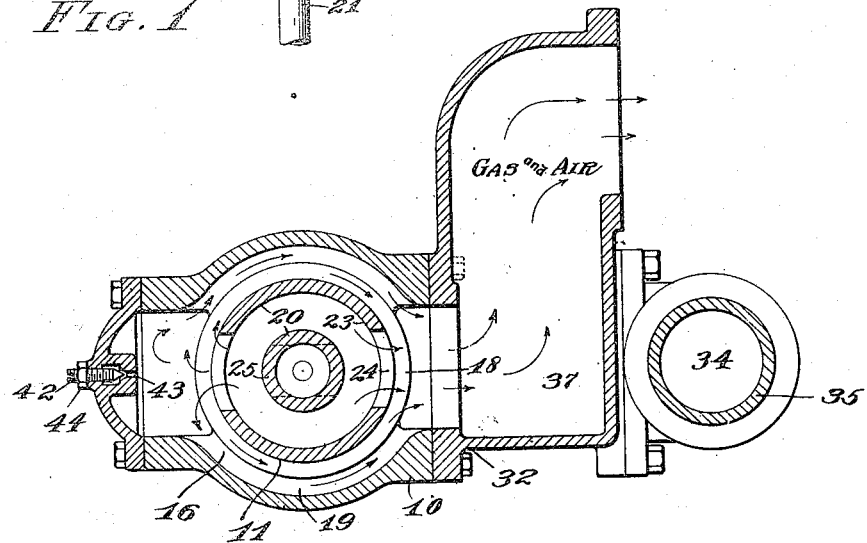

In the drawing, Figure 1 is a longitudinal section of our valve with the coöperating chambers and passageways on a plane in which the axis of the piston lies; Fig. 2 is a transverse section, substantially on the plane indicated by the line 2—2 of Fig. 1.

Referring to the parts by reference numerals, 10 indicates the valve casing, which is provided with a cylindrical bore 11 for a piston valve and with heads 8 and 9.

20 indicates the piston valve, which is slidable within the bore 11, and is secured to the valve rod 21, shown as passing through the head 9. Any suitable governing device, not shown, may be connected with this valve rod. Near one end, the valve casing has an annular chamber 14 in open communication with the gas supply from a pipe 30 by means of the communicating intermediate chamber 31 in the bonnet 32, which is connected with the valve casing. Similarly near the other end, the casing has a chamber 15 in open communication with a chamber 33 in the bonnet, which latter chamber is a passage for the air supply. As shown, an elbow 34 secured to the bonnet connects with a pipe 35, which may be in open communication with the atmosphere, or may otherwise receive air as desired. Intermediately of the chambers 14 and 15, the valve casing has an annular chamber 16, adapted to receive from the interior of the valve, the combined gas and air and allow it to pass through the chamber 37 of the bonnet to the engine, not shown.

The piston valve 20, referred to, has an outer cylindrical wall 23 engaging the bore 11, and through this wall are ports 24 adapted to register with ports through the cylindrical wall to the casing. There are preferably a number of these ports, both through the piston wall and the casing wall, the latter ports being provided by means of the space between annular rings 18, held by webs 19 from the body of the casing. As shown in the drawing, there are two of these rings 18, whereby three sets of ports are provided to the chamber 16; coöperating with these three sets of ports, are three sets of ports 24 through the wall 23. The valve 20 is provided with a central tubular portion 25, the wall of which is connected with the wall 23 by a diaphragm 26. The bore of the portion 25 is in open communication with the valve chamber at the gas-inlet end. At its opposite end this tubular portion 25 has a head 28, which receives the valve rod 21, and between this head and the cylindrical wall 25 are lateral openings 29. Accordingly, gas at the upper end of the valve chamber, as shown in Fig. 1, may pass downwardly through the bore of the tube 25, outwardly through the passageways 29, mixing with the air from the chamber 15, in the annular chamber between the valve walls 25 and 23. The piston has a wall 27, extending upwardly above the diaphragm 26, and adapted to overlap the port 12 from the gas chamber 14. A suitable notch 22 is provided in this extension to register with the port 12.

Now, with the construction as described and shown in Fig. 1, gas enters under pressure through the port 12 above the valve 20, and passes downwardly through the central tubular portion of the valve, and through the passageways 29, and there mixes with the air coming from the chamber 15. The mixed gas and air are drawn by the suction of the engine through the ports 24 into the chamber 16, and pass from thence through the chamber 37 to the engine. Under these conditions, a movement of the rod 21, not only acts to control the gas being admitted through the port 12, but also controls the mixed gas and air passing through the ports 24. As the mixed gas and air has a much less pressure than the gas alone, its passageways are correspondingly larger, and hence, there need not be such accurate positioning of the valve with reference to the casing ports to produce a given regulation. Therefore, not only does our valve insure the proper mixing of the gas and air by bringing the two together in the manner illustrated, but it controls the supply of the mixture to the engine very accurately and effectively.

When the engine is running light, very little gas is needed, and the valve nearly closes the port 12, and accordingly, a small movement of the valve from this position might make a very decided percentage of change in the gas supply. To prevent any such abrupt action by the governor, we provide means for constantly supplying a certain minimum amount of gas directly to the chamber 16 independently of the governing valve. This we accomplish by providing a by-pass 40 from the chamber 14 to the chamber 16, this by-pass being shown as located in a plate or head 41, bolted to the side of the valve casing. This by-pass is effectively regulated by a needle valve or pointed screw 42, which is shown as screwing through the outer wall of the head, and in coöperation with a port 43 in the inner wall. A jam nut 44 locks this screw. When the engine is running with a load, the port 12 is open wide enough so that the amount of gas passing through the port 43 is negligible. On the other hand, when the engine is running light, the port 12 is so nearly closed that a considerable portion of the gas used is passing through the port 43, so that the governor regulation of the port 12 under these circumstances, produces a less variation.

Having thus described our invention, what we claim is:—

1. The combination, with a casing having a cylindrical bore, an annular passageway for gas in said casing having a port communicating with said bore, an annular passageway for gas and air in said casing having a port communicating with said bore, a piston valve within said port having its wall provided with openings adapted to register with the respective ports, a partition in the interior of said valve leading inwardly from its wall, a central tube forming a portion of the valve and leading from said partition and in communication with the space on the gas side of the partition, a head carried by the central tube, a longitudinally slidable valve rod connected with said head, a passageway from said central tube into the annular space between it and the valve wall, and a passageway within the casing for air into such annular space.

2. The combination, with a passageway for gas and a passageway for mixed gas and air, of means for controlling the gas in its passage from the gas passageway to mix with air, means for controlling the passage of the mixed gas and air, and means for conveying gas from the gas passageway to the mixed gas and air passageway without being under the control of either of said means.

3. The combination, with a valve chamber, having a gas passageway communicating therewith and a gas and air passageway leading therefrom, of a valve in said chamber adapted to throttle the gas in passing to the chamber, and a by-pass leading independently of the valve from the gas passageway to the gas and air passageway.

4. The combination, with a valve chamber having a gas passageway communicating therewith and a gas and air passageway leading therefrom, of a valve in said chamber adapted to throttle the gas in passing to the chamber and to conduct such gas into communication with air and to throttle the gas and air in passing from the chamber, a by-pass leading independently of the valve from the gas passageway to the gas and air passageway, and a needle valve for controlling said by-pass.

5. The combination of a valve casing, having annular chambers for gas and for gas and air combined, a valve in said casing adapted to throttle the gas as received from the gas chamber, to convey the throttled gas into communication with air and to throttle the mixed gas and air as it passes to the other chamber, a plate forming a portion of the wall of both annular chambers, a passageway in said plate forming a by-pass from the gas chamber to the air and gas chamber, and a valve for controlling said passageway.

In testimony whereof, we hereunto affix our signatures in the presence of two witnesses.

JOSEPH B. MERIAM.
HARRY L. ALLEN.

Witnesses:
ALBERT H. BATES,
BRENNAN B. WEST.